Oct. 19, 1954 W. P. SCHMITTER 2,691,875
TORSIONALLY RESILIENT COUPLING
Filed Aug. 6, 1949
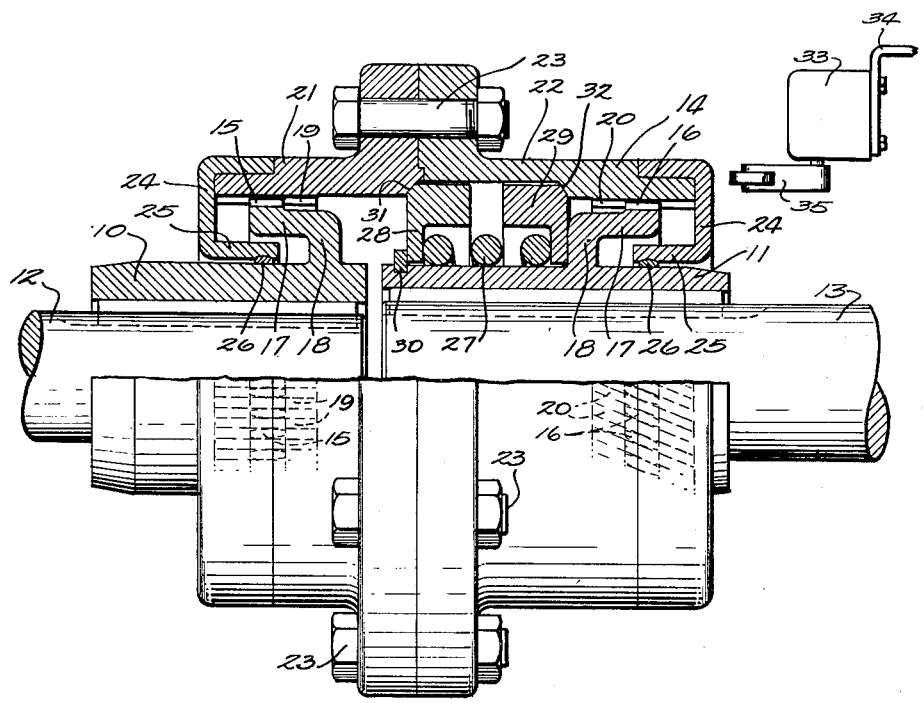
Inventor
WALTER P. SCHMITTER
By Ralph...Brown
Attorney

Patented Oct. 19, 1954

2,691,875

UNITED STATES PATENT OFFICE 2,691,875

TORSIONALLY RESILIENT COUPLING

Walter P. Schmitter, Wauwatosa, Wis., assignor to The Falk Corporation, Milwaukee, Wis., a corporation of Wisconsin Application August 6, 1949, Serial No. 109,039

6 Claims. (Cl. 64—15)

This invention relates to couplings and particularly to flexible couplings of the torsionally resilient type.

One object of the present invention is to provide a flexible coupling having an exceptionally high degree of torsional resilience.

Another object is to provide a torsionally resilient flexible coupling which may be utilized to automatically deenergize the driving motor in the event of overload.

Other more specific objects and advantages will appear, expressed or implied, from the following description of a coupling constructed in accordance with the present invention.

The single figure of the drawing is a view, part in longitudinal section and part in elevation, of a coupling embodying the present invention.

The coupling shown comprises a pair of elongated hubs 10 and 11, respectively keyed to the adjacent ends of substantially aligned shafts 12 and 13, and an encircling lubricant-retainer housing 14 in toothed engagement with both hubs to form a flexible driving connection therebetween. In this instance each hub is provided with a circular series of teeth 15 or 16 formed on a longitudinally extended portion 17 of a collar 18 on the hub, each series of teeth being engaged with a corresponding series of internal teeth 19 or 20 formed within each end of the housing 14.

The faces of the hub teeth 15 and 16 are preferably slightly crowned in a well known manner to permit a limited free tilting action of the housing 14 with respect thereto, so as to provide the lateral flexibility necessary to accommodate shaft misalignment while maintaining a positive driving engagement between the intermeshing teeth.

The housing 14 is shown transversely split into two sections 21 and 22 which are rigidly but separately joined by suitable means, such as bolts 23. The housing is closed by end walls 24 preferably provided with inturned flanges 25, each positioned to underlie the extended portion 17 of the adjacent hub collar 18 in a manner to discourage escape of lubricant from the housing. The clearance space between each wall flange 25 and the adjacent hub may be sealed by appropriate means such as an "oilite" ring 26 slidably fitted on the hub and having a spherical surface in close contact with a concave mating surface on the wall flange. Each ring 26 is preferably normally disposed within the plane of one of the sets of hub teeth 15 or 16.

In the coupling shown the housing 14 is movable lengthwise, the teeth 19 and 20 therein being extended to maintain engagement with the hub teeth 15 and 16 in all positions of the housing. This movability of the housing is utilized to render the coupling torsionally resilient, and for this purpose provision is made for imposing an end thrust on the housing in response to the torque load thereon and for resiliently resisting housing movement induced by such thrust. In this instance the desired torque-responsive end thrust is effected by a helical arrangement of the teeth 20 and 16, and the resultant housing movement is resisted by a suitable spring arrangement preferably disposed between the housing 14 and hub 11.

The spring arrangement shown is double-acting in that it functions to resist lengthwise movement of the housing 14 in either direction from the intermediate position shown. It comprises one or more compression springs 27 caged between a pair of floating rings 28 and 29 loosely encircling the hub 11 and axially confined between the collar 18 and a split stop ring 30 on the hub. The rings 28 and 29 are also axially confined between an internal shoulder 31 on the housing section 21 and a similar shoulder 32 on the housing section 22.

The arrangement is such that whenever the torque reaction between the hub teeth 16 and housing teeth 20 is in a direction to force the housing 14 toward the left from the position shown, the housing shoulder 32 forces the ring 29 toward the left against the resistance of the spring 27, the spring reaction being sustained by the other ring 28 and ultimately by the stop ring 30 on the hub 11 against which the ring 28 is then engaged; and whenever the torque reaction between the teeth 16 and 20 is in a direction to force the housing toward the right, the housing shoulder 31 forces the ring 28 toward the right against the resistance of the spring 27, the spring reaction then being sustained by the ring 29 and ultimately by the collar 18 on hub 11 against which the ring 29 is then engaged. It will thus be noted that, regardless of the direction, the end thrust imposed on the housing 14 by the hub 11 is resisted by the spring 27 and that the resistance of the spring is sustained by the same hub 11, so that there is no resulting end thrust imposed on either of the shafts 13 or 12.

The housing teeth 15 and hub teeth 19 are preferably straight rather than helical in order to avoid imposing an end thrust on either shaft.

In the coupling shown those contacting surfaces on the shoulder 31 and the spring retainer ring 28 are preferably substantially spherical and concentric with respect to that ring 26 which is encircled by the hub teeth 16, and the contacting surfaces on the shoulder 32 and on the spring retainer ring 29 are also preferably substantially spherical and concentric with respect to that ring 26 which is encircled by the hub teeth 15, so as to accommodate a limited free tilting action of the housing 14 about either of said centers with a minimum disturbance to the spring retainer rings.

From the foregoing it will of course be understood that the lengthwise movement of the housing 14, induced by the reaction between the helical teeth 16 and 20 and resisted by the spring 27, is responsive to the torque load imposed on the coupling. This movement may be advantageously utilized to automatically limit the torque load so as to avoid excessive overload and consequent damage to the coupling or to mechanism with which it is connected. For instance, when the coupling is employed to connect an electric motor to mechanism driven thereby, a suitable motor stop switch may be provided for actuation by lengthwise movement of the housing 14 so as to deenergize the motor when the torque attains a predetermined value. A conventional stop switch for this purpose is indicated at 33.

The switch 33 is preferably a normally closed snap switch of any known or approved type mounted on a suitable bracket 34 and having a control element 35 operable to open the same, the latter being disposed within the path of lengthwise travel of the coupling housing 14. The arrangement is such that, as the housing 14 moves toward the element 35 under increasing torque loads, it ultimately engages and actuates the same to open the switch 33 and to thereby stop the motor whenever the torque reaches a predetermined maximum.

Various changes may be made in the embodiment of the invention hereinabove specifically described without departing from one sacrificing the advantages of the invention as defined in the appended claims.

I claim:

1. A power coupling comprising driving and driven rotary coupling members, a lengthwise movable connector member, separate laterally flexible driving connections between each of said coupling members and said connector member, said flexible driving connections cooperating with said connector member to accommodate both parallel and angular misalignment between said coupling members, one of said flexible driving connections comprising intermeshing teeth on said connector member and one of said coupling members, said intermeshing teeth having inclined faces reacting under the transmitted torque to impose an end thrust on said connector member, and resilient means reacting on said last mentioned coupling member and on said connector member to sustain the end thrust imposed on the latter.

2. A power coupling comprising driving and driven coupling members, a lengthwise movable connector member, separate laterally flexible driving connections between each of said coupling members and said connector member, said flexible driving connections cooperating with said connector member to accommodate both parallel and angular misalignment between said coupling members, one of said flexible driving connections including means reacting under the torque load to impose an end thrust on said connector member in one direction or the other dependent upon the direction of operation, and a caged resilient means operable to sustain the end thrust imposed on said connector member in either direction of operation.

3. A power coupling comprising driving and driven rotary coupling members, a lengthwise movable connector member, separate laterally flexible driving connections between each of said coupling members and said connector member, said flexible driving connections cooperating with said connector member to accommodate both parallel and angular misalignment between said coupling members, one of said flexible driving connections including torque responsive means imposing an end thrust on said connector member in one direction or another dependent on the direction of operation, resilient means for sustaining the end thrust thus imposed, means for transmitting from said connector member to said resilient means an end thrust in one direction, and means for transmitting from said connector member to said resilient means an end thrust in an opposite direction.

4. A power coupling comprising driving and driven coupling members, a lengthwise movable connector member, separate torque transmitting connections between said coupling members and connector member, each of said torque transmitting connections being laterally flexible to accommodate misalignment between said coupling members, one of said torque transmitting connections including torque responsive means for imposing an end thrust on said connector member in one direction or the other dependent on the direction of operation, resilient means for sustaining said end thrust, means for transmitting from said connector member to said resilient means an end thrust in one direction, and means for transmitting from said connector member to said resilient means an end thrust in an opposite direction.

5. A power coupling comprising driving and driven members each having a circular set of teeth thereon, a torque transmitting connector having a circular set of teeth coacting with said teeth on said driving member to provide a laterally flexible torque transmitting connection therebetween, said connector having a second set of teeth coacting with said teeth on said driven member to provide a laterally flexible torque transmitting connection therebetween, whereby said connector is free to float in a manner to accommodate parallel and angular misalignment between said members, the teeth on one of said members having faces inclined so as to impose a longitudinal thrust on said connector in response to the torque transmitted thereby, and resilient means reacting on said connector and on said last mentioned member to yieldably resist the longitudinal thrust imposed on said connector and to counteract the reaction thrust on said last named member.

6. A power coupling comprising driving and driven coupling members, a torque transmitting connector, a laterally flexible driving connection between said driving member and said connector, a laterally flexible driving connection between said connector and said driven member, whereby said connector is free to float in a manner to accommodate parallel and angular misalignment between said driving and driven members, one of said flexible driving connections including torque responsive means for imposing a longitudinal thrust on said connector in either of two directions, and means for yieldably resisting said thrust regardless of the direction thereof, said last named means including a pair of axially spaced thrust transmitting rings, thrust sustaining resilient means axially confined by and between said rings, stop means on said connector coacting with said rings to limit the spacing thereof, and additional stop means on one of said members coacting with said rings to limit the spacing thereof.

References Cited in the file of this patent

UNITED STATES PATENTS

| Number | Name | Date |
|---|---|---|
| 1,024,020 | Perry et al. | Apr. 23, 1912 |
| 1,385,803 | Stone | July 26, 1921 |
| 1,550,753 | Sneed | Aug. 25, 1925 |
| 1,631,196 | Froesch | June 7, 1927 |
| 1,996,311 | Tremolada | Apr. 2, 1935 |
| 2,021,718 | Fast | Nov. 19, 1935 |
| 2,209,155 | Fagg | July 23, 1940 |
| 2,403,389 | Morey | July 2, 1946 |

OTHER REFERENCES

Fasts'-Self-Aligning Coupling, Catalog No. 47, Koppers Co., Inc., Fast Coupling Department, Baltimore 3, Maryland (page 8).